Dec. 21, 1965          J. W. CLARK            3,224,406
           UNDERWATER TOWING CABLE LIFT ATTACHMENT
Filed May 14, 1964                         2 Sheets-Sheet 1
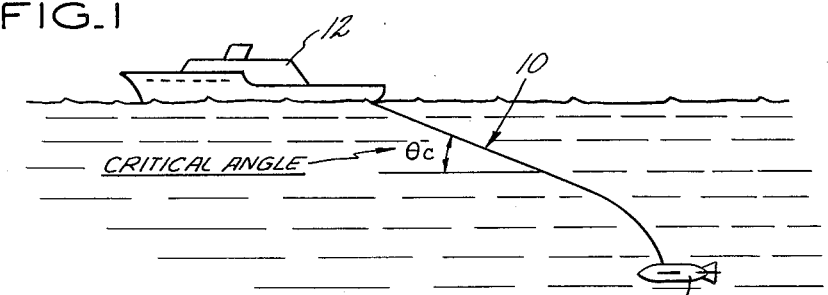
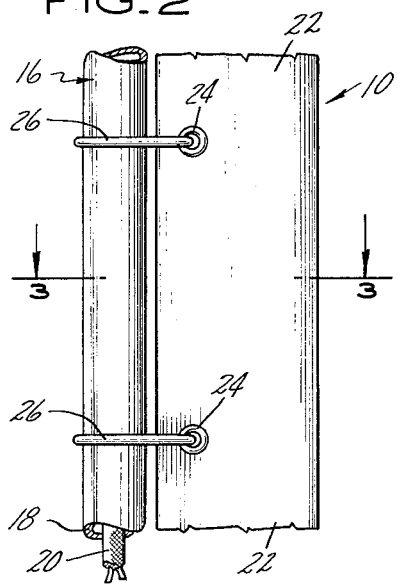
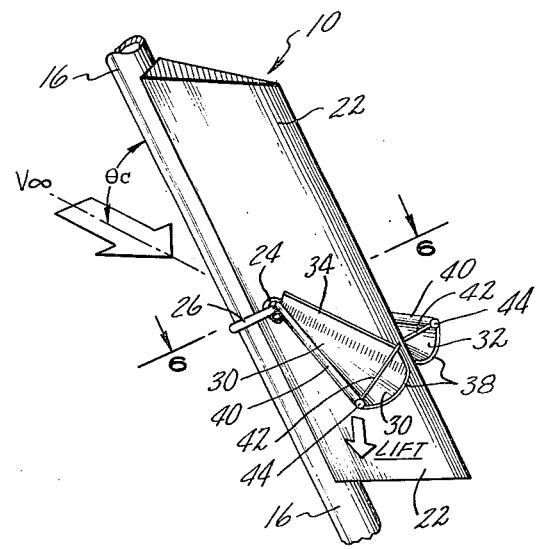
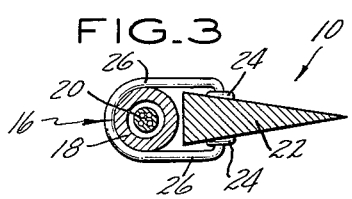
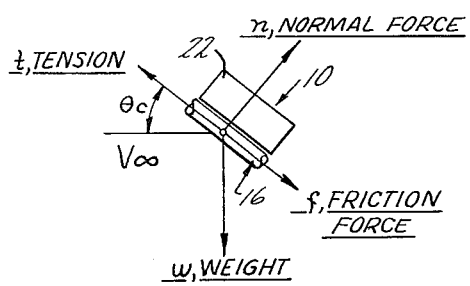
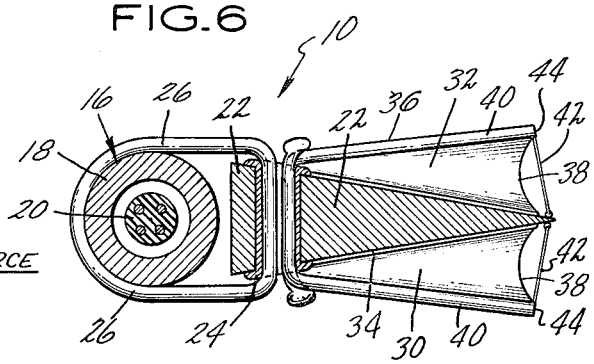
INVENTOR
JAMES W. CLARK
BY Vernon F. Hauschild
        ATTORNEY

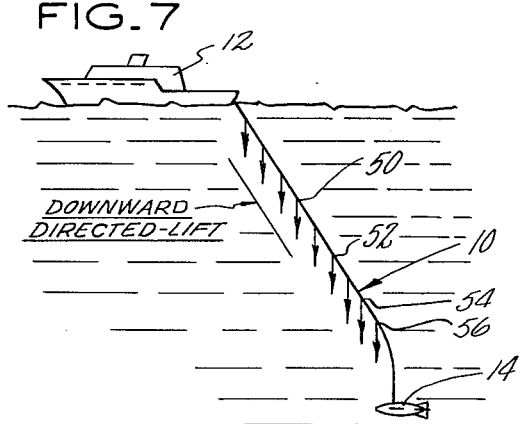
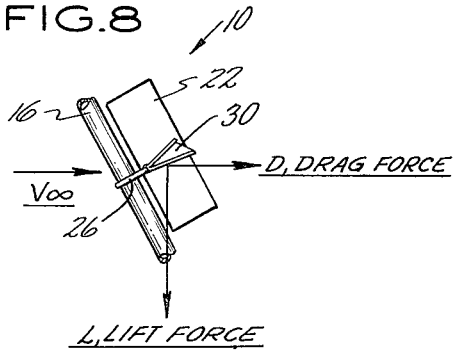
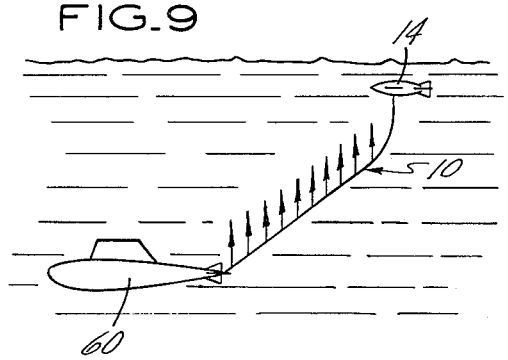
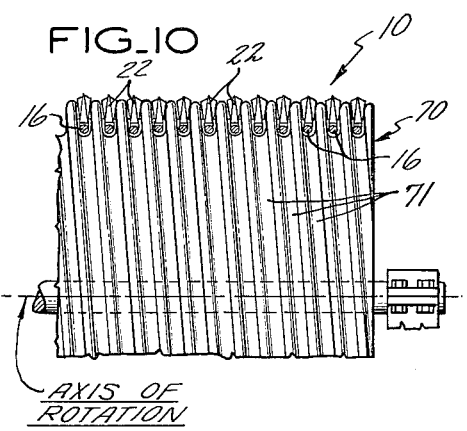
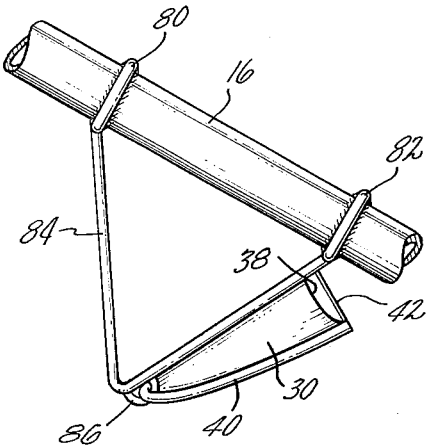
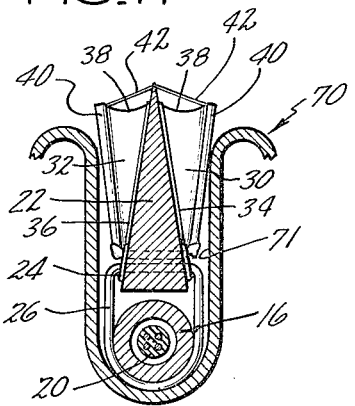
INVENTOR
JAMES W. CLARK
BY Vernon F. Hauschill
ATTORNEY

United States Patent Office 3,224,406
Patented Dec. 21, 1965

3,224,406
UNDERWATER TOWING CABLE LIFT ATTACHMENT
James W. Clark, Glastonbury, Conn., assignor to United Aircraft Corporation, East Hartford, Conn., a corporation of Delaware
Filed May 14, 1964, Ser. No. 367,477
5 Claims. (Cl. 114—235)

This invention relates to underwater towing apparatus in which increased depth is attainable for the package towed at high speed by air-borne, surface or sub-surface vehicles and more particularly to appendages to be attached to the underwater towing cable along its length to distribute downwardly-directed lift along the cable and hence increase apparent cable weight and the critical angle assumed by the cable during towing.

It is a characteristic of underwater towing cable that hydrodynamic loads thereon vary with speed and cable incidence angle with respect to the free-stream flow. As towing speeds increase, the cable incidence angle decreases, with the result that greater lengths of cable and hence larger towing forces are required to maintain the load being towed at a given depth.

It is an object of this invention to teach underwater towing apparatus which is capable of towing an underwater load at a substantial depth when operating at high speeds.

It is an object of this invention to teach appendages to an underwater towing cable which have the function of distributing downwardly-directed lift along the cable, thereby reducing the tendency of the cable to bend into a nearly horizontal attitude.

It is an object of this invention to teach appendages to be used at selected stations along the length of an underwater towing cable and which have the function of increasing the apparent weight of the cable.

It is still a further object of this invention to teach appendages to an underwater towing cable which increase directional stability of the cable or reduce yaw effect therein.

It is still a further object of this invention to teach appendages to an underwater towing cable which will damp out cable vibrations.

It is still a further object of this invention to teach appendages to be used at selected stations along the length of an underwater towing cable to produce lift along the cable which is effective even though the lift efficiency of the appendage is not high.

It is still a further object of this invention to teach underwater towing apparatus which is sufficiently flexible that it can be wound onto a grooved drum of a winch for storage aboard ship or elsewhere.

Other objects and advantages will be apparent from the specification and claims and from the accompanying drawings which illustrate an embodiment of the invention.

FIG. 1 is a schematic diagram of a surface vessel towing an underwater package, such as sonar, by means of a towing cable.

FIG. 2 is a fragmentary showing of a conventional towing cable.

FIG. 3 is a cross-sectional showing through line 3—3 of FIG. 2.

FIG. 4 is a diagram of forces acting upon a towing cable.

FIG. 5 is a fragmentary showing of a towing cable with my lift created appendages attached thereto.

FIG. 6 is a showing taken along line 6—6 of FIG. 5.

FIG. 7 is a schematic showing of surface vessel towing an underwater package with my appendages attached at selected stations longitudinally along the towing cable.

FIG. 8 is a schematic showing of the forces created by each of my appendages upon the towing cable.

FIG. 9 is a schematic representation of a deeply submerged submarine towing a package near the surface of the water using my appendages to create upwardly-directed lift.

FIG. 10 is a showing of my underwater towing apparatus stored on a grooved drum.

FIG. 11 is a partial enlarged showing from FIG. 10 to illustrate the storage of my underwater towing apparatus in greater particularity.

FIG. 12 is a showing of apparatus to attach my lift created appendages to underwater towing cable when a fairing is not used with the cable.

Referring to FIG. 1 we see underwater towing apparatus 10 being towed by surface vehicle 12 and towing underwater package or load 14. Conventionally, underwater towing apparatus 10, as best shown in FIGS. 2 and 3 comprises cable 16, which includes a load-carrying sheath 18 surrounding an electrical core 20 and an air foil or low-drag shaped fairing 22, made of hard rubber or a synthetic material having some degree of flexibility. Cable 16 and fairing 22 extend lengthwise or longitudinally of one another. Spaced grommets 24 extend through fairing 22 and ring clips 26 loosely surround cable 16 and pass through grommet 24 so that both longitudinal and rotary relative motion is permitted between cable 16 and fairing 22.

As indicated in FIG. 1, the incidence angle of cable 16 with respect to free-stream flow is designated as critical angle $\theta_c$. The critical angle $\theta_c$ of the cable 16 is determined by the forces acting thereon shown in FIG. 4. The following equations can be written from the FIG. 4 diagram:

$$\operatorname{ctn} \theta_c \csc \theta_c = \frac{\text{constant} \times V_\infty^2}{\omega} \quad (1)$$

or $$\theta_c \sim \frac{\sqrt{\omega}}{V_\infty}$$

where $\omega$ represents cable weight per unit length $V_\infty$ represents free-stream velocity of the water. It will therefore be seen that critical angle $\theta_c$ has a tendency to decrease or become shallow as the free-stream velocity increases but also has a tendency to increase or become larger as the weight of the cable increases. It is accordingly the object of this invention to teach appendages to a towing cable 16 which have the effect of producing downwardly-directed lift to the cable and hence increasing the apparent weight of the cable.

The preferred embodiment of my invention is shown in FIG. 5 and includes a pair of symmetric and concentric wings or fins 30 and 32, which are flexible and made of cloth, rubber or other flexible material such a Mylar and which include side edges 34 and 36 and base edge 38. Side edge 34 is bonded to fairing 22 while an inflexible leading edge spar 40 attaches to side edge 36 and is pivotally connected to fairing 22, preferably through grommet 24 as best shown in FIG. 6 so that leading edge spars 40 and wings 30 and 32 may be folded flat against fairing 22 for storage purposes to be discussed hereinafter. Flexible wires 42 connect the trailing edge 44 of leading edge spars 40 to fairing 22 so as to limit the extension of the wing when it is hydrodynamically loaded by the free-stream water passing thereby during the towing operation.

While a single pair of wings 30 and 32 are shown in FIG. 5, it should be borne in mind that it is important to this invention that a plurality of wing pairs be positioned at selected longitudinal station along the length of fairing 22, such as the stations indicated by the downwardly-directed arrows in FIG. 7, for example stations 50, 52, 54 and 56.

With the wings such as 30 and 32 hydrodynamically loaded as shown in FIG. 8, both a lift force L and a drag force D are created upon cable 10 by the hydrodynamic loading of wings 30 and 32. Both forces L and D tend to increase the tension in the cable; however, calculations show that the large reductions in cable length required due to the increased critical angle reduce the tow force required much more than the tow force is increased by the added lift and drag of the appendages 30 and 32. The net increase in depth or decrease in tow force is dependent upon the length of cable which is at the critical angle $\theta_c$; the greater this length, the greater will be the benefits realized from the downwardly-directed lift. Calculations indicate that for this portion of the cable a reduction in tow force required per foot of depth by a factor of approximately 9.0 may be achieved at a towing speed of 40 knots for appendages having the following characteristics: lift/cable-weight=10; lift/drag=3; total wing span=1.74 inches; spacing between successive appendages=1.0 foot. Alternatively this would correspond to an increase in depth for this portion of the cable of approximately a factor of 9.0 for the same tow force.

While this invention has been described in connection with appendages to increase apparent weight and produce a downwardly-directed lift on tow cable 16, it should be borne in mind that by proper placement of appendages 30 and 32, and controlled attitude between the surfaces of these appendages and the free-stream velocity $V\infty$, the lift created on appendages 30 and 32 could be made upwardly directed so that this invention may be used to permit, as best shown in FIG. 9, a submarine 60 to tow a package 14 close to the surface of the water while the submarine is deeply submerged.

An advantage of the flexible towing apparatus 10, with appendages 30 and 32 taught herein is that it can be stored by winding onto a conventional grooved winch drum 70, shown in FIGS. 10 and 11. Since relative motion is permitted by clips 26 between cable 16 and fairing 22 and since appendages 30 and 32 are folded back against fairing 22 upon contact with the sides of the grooved winch drum 70, this towing cable construction lends itself readily to storage on grooved drum 70. By viewing FIG. 11, it will be noted that the shape of the grooves 71 on winch 70 automatically fold leading edge spars 40 and appendages 30 and 32 back against fairing 22.

While, in my preferred embodiment, fairing 22 should be used, it should be borne in mind that attachment of appendages 30 and 32 could be made directly to cable 16 as best shown in FIG. 12. Fixed rings 80 and 82 grip cable 16 and support V-shaped frame 84 therefrom. Leading edge spar 40 is pivotally connected to V-shaped frame 84 at hook 86 and is connected at its trailing edge to frame 84 by flexible wire 42. Wings such as 30 extend between support 84 and leading edge spar 40, on opposite sides of frame 84 so as to be symmetric or concentric thereabout.

It is to be understood that the invention is not limited to the specific embodiment herein illustrated and described but may be used in other ways without departure from its spirit as defined by the following claims.

I claim:

1. In a underwater towing apparatus, a flexible cable, a plurality of flexible wings positioned in symmetric pairs at selected stations along said cable, and means to support said wings so that water motion during cable towing will act upon said wings to hydrodynamically generate lift forces along said cable.

2. In underwater towing apparatus, a flexible cable having an axis, a low-drag shaped fairing loosely connected to said cable throughout a portion of cable length so that relative motion is permitted between said cable and said fairing, a plurality of flexible wings positioned in symmetric pairs on opposite sides of said fairing and said wing pairs located at selected stations along said cable axis, and means to support said wings so that water motion during cable towing will act upon said wings to hydrodynamically generate lift forces along said cable.

3. In underwater towing apparatus, a flexible cable, a plurality of flexible wings positioned in symmetric pairs at selected stations along said cable, and means including spaced clips firmly engaging said cable and carrying a V-shaped frame projecting therefrom to support said wings so that water motion during cable towing will act upon said wings to hydrodynamically generate lift forces along said cable.

4. Underwater towing apparatus comprising a flexible cable, a fairing loosely engaging said cable throughout a portion of its length so that relative longitudinal and rotary motions are permitted therebetween, pairs of flexible wings positioned concentrically on opposite sides of said fairing and located at selected longitudinal stations therealong, each of said wings being bonded to said fairing and connected to a pivotal, inflexible leading edge spar, and means to limit the motion of said spar and hence said wing with respect to said fairing so that cable motion during towing will cause water to act upon said wing to hydrodynamically generate lift forces along said cable.

5. Underwater towing apparatus comprising a flexible cable including a structural sheath surrounding a core, a flexible fairing positioned adjacent said cable throughout a portion of the length of said cable, a plurality of grommets extending through said fairing at spaced intervals, a plurality of ring clips each loosely encircling said cable and passing through one of said grommets to attach said fairing to said cable so that relative longitudinal and rotary motions are permitted therebetween, pairs of flexible wings positioned symmetrically on opposite sides of said fairing and located at selected longitudinal stations therealong, each of said wings being of substantially triangular shape and having two side edges and a base edge, pairs of leading edge spars pivotally attached to said fairing through each of said grommets and extending on opposite sides of said fairing, each of said wings being bonded to said fairing along one of said side edges and connected to one of said leading edge spars along the other of said side edges, and flexible wire means attached to said fairing and said leading edge spar to limit the motion of said spar and hence said wing with respect to said fairing so that cable motion during towing will cause water to act upon said wing to hydrodynamically generate lift forces along said cable and so that said cable, fairing and wings may be wound upon a grooved drum with said wings collapsed.

References Cited by the Examiner

UNITED STATES PATENTS

| 2,401,783 | 6/1946 | Wilcoxon | 114—235 |
| 3,060,886 | 10/1962 | Rather et al. | 114—235 |

FOREIGN PATENTS 489,139   7/1938   Great Britain.

MILTON BUCHLER, *Primary Examiner.*

T. M. BLIX, *Examiner.*